(12) United States Patent
Boliek et al.

(10) Patent No.: US 6,510,246 B1
(45) Date of Patent: *Jan. 21, 2003

(54) DOWNSAMPLING AND UPSAMPLING OF BINARY IMAGES

(75) Inventors: Martin Boliek, San Francisco, CA (US); Michael J. Gormish, Redwood City, CA (US); Edward L. Schwartz, Sunnyvale, CA (US)

(73) Assignees: Ricoh Company, LTD, Tokyo (JP); Ricoh Corporation, West Caldwell, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,139

(22) Filed: Sep. 29, 1997

(51) Int. Cl.$^7$ .................................................. G06K 9/36
(52) U.S. Cl. ........................................ 382/232; 382/166
(58) Field of Search ................................. 382/240, 233, 382/276, 293, 294, 295, 298, 299, 300, 301, 307, 308, 312, 318, 321, 324, 284, 250, 166; 348/392, 404, 408, 419; 345/127; 358/433; 325/240.24, 240.01, 240.05

(56) References Cited

U.S. PATENT DOCUMENTS

| | | | | | |
|---|---|---|---|---|---|
| 5,289,548 A | * | 2/1994 | Wilson et al. | ............... | 382/250 |
| 5,341,442 A | * | 8/1994 | Barrett | ........................ | 382/166 |
| 5,410,616 A | * | 4/1995 | Kidd | ............................ | 382/299 |
| 5,614,952 A | * | 3/1997 | Boyce et al. | .......... | 375/240.01 |
| 5,646,686 A | * | 7/1997 | Pearlstein | ................ | 348/392.1 |

* cited by examiner

*Primary Examiner*—Andrew W. Johns
*Assistant Examiner*—Duy M. Dang
(74) *Attorney, Agent, or Firm*—Blakely, Sokoloff, Taylor & Zafman LLP

(57) ABSTRACT

This provides for processing information by receiving downsampled pixel values, via, for instance, error diffusion, and upsampling each of the downsampled pixel values to construct a block of upsampled pixel values using statistics based on template pattern values of a predetermined number of downsampled pixel values or using replication.

48 Claims, 8 Drawing Sheets

TOP/BOTTOM OF SQUARE = BIT 10 = 0,
LEFT/RIGHT OF SQUARE = BIT 11

TOP/BOTTOM OF SQUARE = BIT 10 = 1,
LEFT/RIGHT OF SQUARE = BIT 11

TOP/BOTTOM OF SQUARE = BIT 10 = 0,
LEFT/RIGHT OF SQUARE = BIT 11

TOP/BOTTOM OF SQUARE = BIT 10 = 1,
LEFT/RIGHT OF SQUARE = BIT 11

DOWNSAMPLING AND UPSAMPLING OF BINARY IMAGES

FIELD OF THE INVENTION

The present invention relates to the field of compression and decompression systems; more particularly, the present invention relates to compression/decompression of binary images via sampling.

BACKGROUND OF THE INVENTION

Downsampling and upsampling of data are well known in the art. In binary images, downsampling often refers to a sampling of the image data by a factor of two in both the horizontal and vertical directions. Upsampling refers to reconstruction from the subsampled image by expanding the data by a factor of two in the horizontal direction and by a factor of two in the vertical direction.

Numerous downsampling methods are well known in the art. For instance, the downsampled pixel value of a block of pixels in an image may be the medium value of all pixels in that block. In another implementation, where the block size is four pixels, which is typical, the values of the pixels in the block may be added together and divided by four. In still another implementation, one of the pixel values, such as the upper left corner pixel value, may be taken to represent all the pixel values in the block.

Current products perform downsampling and/or upsampling. For instance, Integrated Device Technology, of Santa Clara, Calif., sells an integrated circuit chip implementing lossy compression by run-length coding and Lempel-Ziv coding. The lossy compression uses a simple downsampling method for compression, and replication with smoothing for upsampling.

Replication refers to the duplication of a downsampled value in both the horizontal and vertical directions to reconstruct an original image. Replication with smoothing allows for selecting pixel values based not only on a downsampled value that is being upsampled but on neighboring pixel values as well.

The JBIG (lossless binary compression) Standard specifies a method to reduce the binary image so as to maintain horizontal, vertical and diagonal lines and edges and to maintain some patterns. For instance, see ISO IS 11544 (ITU-¶.82). The standard, however, only discusses the use of the low resolution image and using compressed data to recreate the lossless high resolution data.

Downsampling data by a factor of two in each direction (horizontal and vertical) clearly guarantees that only one quarter of the image. This guarantee is very beneficial, but the image quality that results from upsampling for reconstruction later may not be good. Therefore, it would be desirable to increase the image quality that results after upsampling a downsampled image or other set of data while ensuring that the bit rate remains constant.

SUMMARY OF THE INVENTION

A method and apparatus for compressing information is described. The present invention includes a method and apparatus for receiving binary pixel values and for downsampling the binary pixel values to generate a downsampled pixel value for each block of binary pixel values. The downsampled pixel values for each block of pixel values is generated based on a summation of pixel values in each block and at least one other value generated as a result of previously downsampling another block of pixels which is in a predetermined causal relationship with that particular block of pixel values.

The present invention also provides for processing information through the use of a method and apparatus for receiving downsampled pixel values and for upsampling each of the downsampled pixel values to construct a block of upsampled pixel values using statistics based on template pattern values of a predetermined number of downsampled pixel values.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
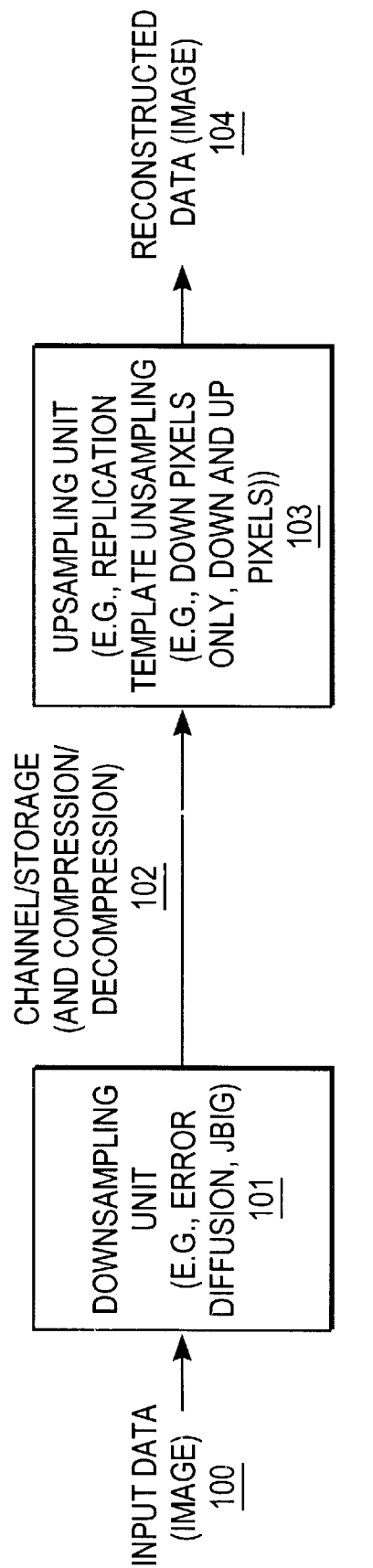
FIG. 1 illustrates an overview of the system of the present invention.

Methods and apparatuses of upsampling and downsampling is described. In the following description, numerous details are set forth, such as sizes of templates, sizes of addresses, numbers of bits, specific bits used for contexts, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions described below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also as discussed below, the present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMS, magnetic or optical cards, or any type of media suitable for storing electronic instructions, and each coupled to a computer system bus. The algorithms presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides for sampling binary images. A binary image is an image in which each of the pixels is represented by a single bit, the setting of which indicates whether the pixel is black or white. It should be noted, however, that the present invention may also be applied to other images (e.g., color images) having binary components.

While performing downsampling and upsampling of binary images, the compression of binary images may be made to provide fixed rate compression. In other words, by performing downsampling (for upsampling thereafter), the memory used to store such data may be reduced because it does not have to be large enough to compensate for times when data overflows the allocated amount of memory for the compressed image. The present invention provides for fixed rate compression using downsampling while increasing the quality of the data resulting from upsampling the downsampled data, when compared to those methods described below.

Referring to FIG. 1, an overview of the system of the present invention is shown. Referring to FIG. 1, input data 100, such as a binary image, is downsampled by downsampling unit 101. In one embodiment, the downsampling by downsampling unit 101 uses an error diffusion technique of the present invention described below. In another embodiment, the downsampling performed by downsampling unit 101 is the JBIG downsampling technique. The downsampled image which results from downsampling is sent out to a channel/storage 102. The downsampled data may also undergo further compression, using one or more compression techniques, prior to being sent on a channel or being stored.

Upsampling unit 103 performs upsampling on the data received from channel/storage 102. In the case where further compression was used before the downsampled data was sent on a channel or was stored, decompression is performed prior to data being received by upsampling unit 103. In one embodiment, the upsampling performed by upsampling unit 103 is replication. In another embodiment, the upsampling is performed by using template upsampling based on either down pixels only (in one embodiment) or both down and up pixels (in an alternative embodiment). The result of upsampling produces a reconstructed data 104 (e.g., a reconstructed image).

It should be noted that the teachings of the present invention may be applied to subsampling in only one dimension (e.g., either horizontal, vertically, diagonally, etc.) or multiple dimensions (e.g., two dimensional—horizontally and vertically).

Furthermore, the present invention may be applied to pixels having different shapes. That is, the present invention is not limited to application to square pixels. However, the shape of the pixel may influence direction(s) of sampling.

Downsampling

The present invention provides a variety of downsampling techniques. It should be noted that either of these downsampling: techniques explicitly described herein may be used in cooperation with one of the upsampling techniques described below or others not described herein. Note also that other downsampling techniques not described herein may be used with the upsampling techniques described below.

Error Diffusion Downsampling

The present invention provides for downsampling when four pixels (two horizontal and two vertical) are represented by a single pixel. In such a case, an error is possible. If all four pixels are white or all four pixels are black, then the downsampled pixel can represent the four without error. However, if one or two pixels are different, then an error of one or two is made.

The present invention provides for passing the error on to the next downsampled pixel to the right or below the current one. The error value is used in determining what the downsampled value is for those pixels. In one embodiment, the error is passed on to both the downsampled pixel to the right and the downsampled pixel below.

As discussed above, in one embodiment, the error diffusion of the present invention may be used to downsample in only one dimension, instead of two dimensions.

Figure 2:
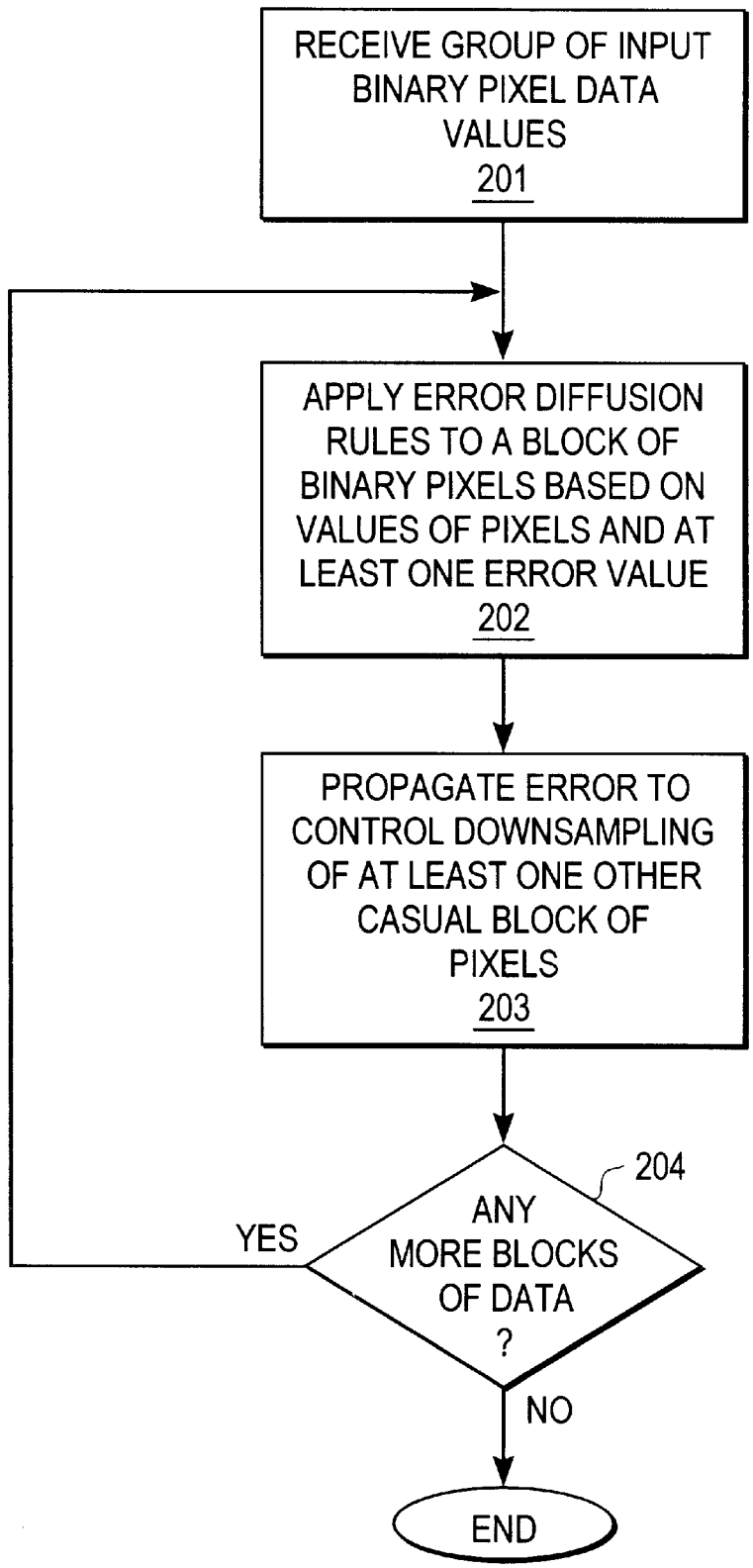
FIG. 2 illustrates one embodiment of the downsampling method of the present invention.

FIG. 2 illustrates one embodiment of the downsampling method of the present invention. The downsampling method is performed by processing logic. The processing logic may be implemented in hardware (e.g., hardwired logic), software (e.g., such as running on a computer system) or a combination of both.

Referring to FIG. 2, processing logic begins by receiving a group of input binary pixel data values (processing block 201). Then, processing logic applies error diffusion rules to a block of binary pixels based on the values of pixels and at least one error value (processing block 202). In one embodiment, each block of pixels comprises four pixels, two in the horizontal direction and two in the vertical direction.

The processing logic propagates the error value to control downsampling of at least one of the other blocks of pixels (processing block 203). In one embodiment, the control refers to the use of the error in selecting the downsampling pixel value for that block of pixel values in the image.

The processing logic then tests whether there are any more blocks of data (processing block 204). If there are more blocks of data, processing logic transitions back to processing block 202; otherwise, the process ends.

In one embodiment, one or more error values may be produced. These error values may be the same or different. These error values are passed on to the next downsampled pixel to the right or the next downsampled pixel below the current block being downsampled, respectively. In an alternative embodiment, error values are passed on to the next downsampled pixel to the right and the downsampled pixel below the current one.

Table 1 below illustrates one embodiment of an error diffusion rule table.

TABLE 1

Error diffusion rule table

| Sum of pixels | Previous plus above error | Output value | Next error | Below error |
| --- | --- | --- | --- | --- |
| 0 | -2 | 0 | -1 | -1 |
|   | -1 | 0 | -1 | 0 |
|   | 0 | 0 | 0 | 0 |
|   | 1 | 0 | 1 | 0 |
|   | 2 | 0 | 1 | 1 |
| 1 | -2 | 0 | -1 | 0 |
|   | -1 | 0 | 0 | 0 |
|   | 0 | 0 | 1 | 0 |
|   | 1 | 0 | 1 | 1 |
|   | 2 | 1 | -1 | 0 |
| 2 | -2 | 0 | 0 | 0 |
|   | -1 | 0 | 1 | 0 |
|   | 0 | 0 | 1 | 1 |
|   | 1 | 1 | 1 | 0 |
|   | 2 | 1 | 0 | 0 |
|   | -2 | 0 | 1 | 0 |
|   | -1 | 1 | -1 | -1 |
|   | 0 | 1 | -1 | 0 |
|   | 1 | 1 | 0 | 0 |
|   | 2 | 1 | 1 | 0 |
| 4 | -2 | 1 | -1 | -1 |
|   | -1 | 1 | -1 | 0 |
|   | 0 | 1 | 0 | 0 |
|   | 1 | 1 | 1 | 0 |
|   | 2 | 1 | 1 | 1 |

Note that the values in the table are not binary.

Figure 3:
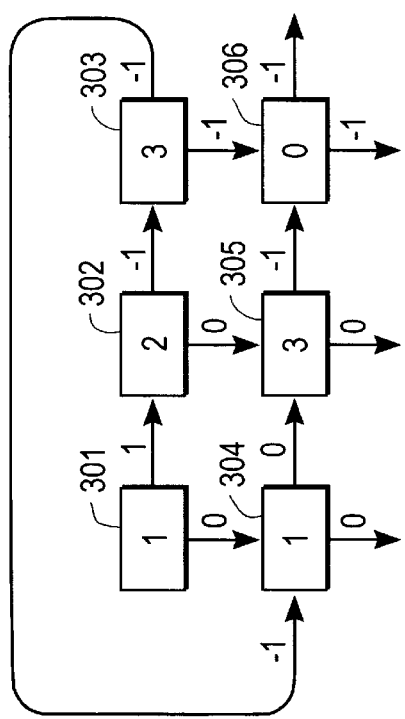
FIG. 3 illustrates the use of an exemplary error diffusion rule table.

FIG. 3 illustrates the use of the diffusion rule table shown in Table 1. Referring to FIG. 3, several blocks of pixel values are shown 301–306, each containing 4 pixels. The sum of the four pixels is indicated in each of blocks 301–306. For instance, in block 301, some of the pixels is 1. Assuming the error previous (received from the downsampled block to the left) plus the above error equals 0 (which are not shown), an output value (downsampled value) for block 301 is 0 and error values to the right (next) and below are 1 and 0 respectively. For block 302, the sum of the pixels is 2 and the sum of the previous and above errors equals 1. Therefore, the output value of block 302 is a 1 with error values propagated to the right and below being -1 and 0, respectively.

Block 303 illustrates an example of what occurs in the case of a block of pixels at the end of a row. When this occurs, the next error value is forwarded for use in deciding the downsampled value for the first block of pixels in the next two rows of pixels (i.e., block 304 for FIG. 3).

Also note that those blocks of pixels in the beginning of the data such as the upper left corner of the image do not have previous or above error values. That is, there is no previous error or an error to the right. In these cases, in one embodiment, the error is 0. In alternate embodiment, the error values may be set to some other predetermined value. The error values need not be the same. Similarly, for the remainder of the blocks of pixels in the top row, the error values from above are assumed to be 0 (or some other predetermined value). Likewise, the error value is produced by a bottom row of pixel blocks are not used in determining the downsampled pixel value of other blocks of pixels.

Figure 4:
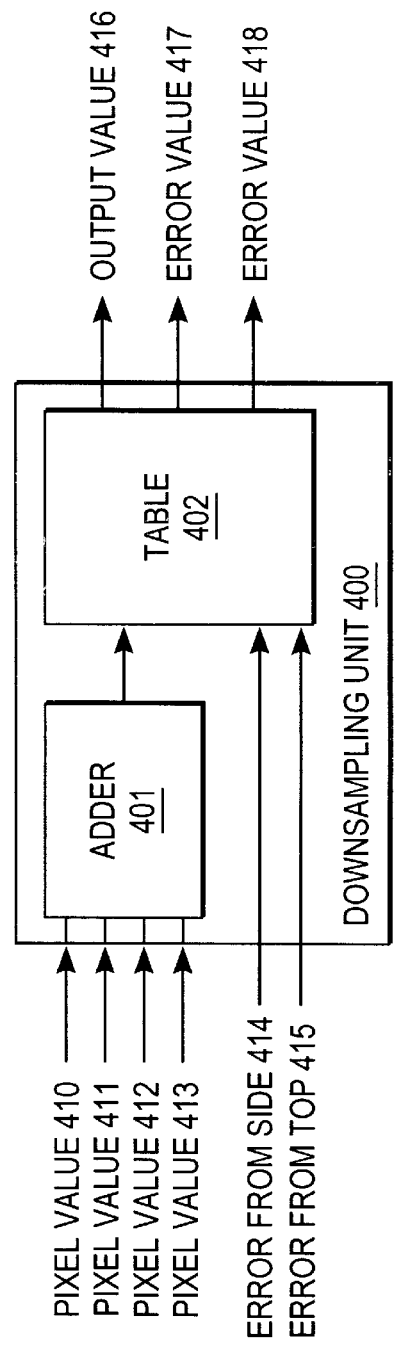
FIG. 4 illustrates one embodiment of the compressor of the present invention.

FIG. 4 illustrates one embodiment of the compressor of the present invention. Referring to FIG. 4, pixel values 410–413 are input to adder 401 in downsampling unit 400, which adds them together and produces a sum value which is input to table 402. Also input to table 402 are the errors generated when downsampling the previous block of pixels (to the left) and when downsampling the block of pixels above. Using these inputs, table 402 outputs value 416, representing the downsampled pixel for the block of pixels, along with error values 417 and 418 representing the next error and the below error of Table 1, respectively.

Figure 5:
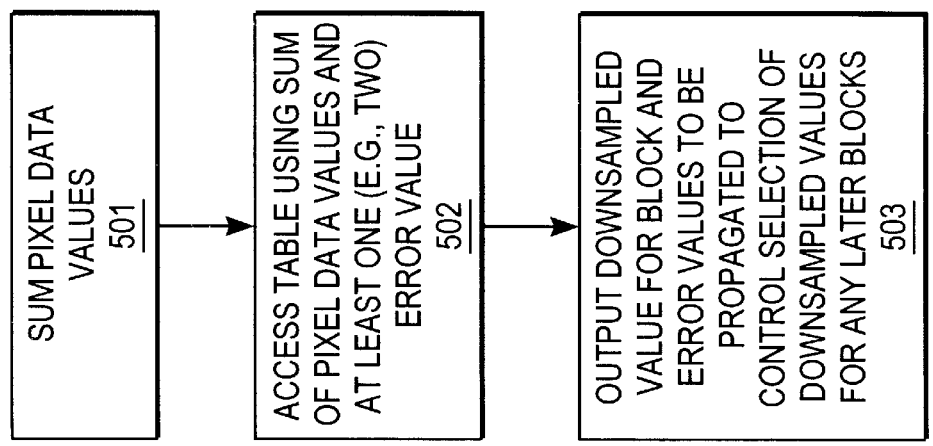
FIG. 5 illustrates one embodiment of a downsampling method using the exemplary error diffusion rule table.

FIG. 5 illustrates the method in which processing logic sums pixels data values (processing block 501), accesses the table using the sum of the pixel data values and at least one error value (processing block 502), and outputs the downsampled value for the block and error values to be propagated to control selection of downsampled values for other blocks (processing block 503).

Using the error diffusion technique of the present invention provides a benefit in that the same number of black and white pixels in the original image in terms of percentage may be maintained in the downsampled image. That is, if there are 70% black pixels in the original image, then there are 70% black pixels in the downsampled image.

Note that the error diffusion rule table above could also be implemented as a set of rules, which can be coded in software or implemented in hardware. The same is true of other tables described herein.

JBIG Downsampling

In the JBIG Standard, a template-based downsampling technique is set forth that uses 12 bits to access a look up table having 4,096 address locations of one bit each. The template pattern and LUT are specified by JBIG. The downsampling set forth by the JBIG standard preserves the sharpness of edges, retains single pixel lines and recreates half tone gray.

One problem associated with using JBIG downsampling is that it is lossy. If lossless is desired, one may still use the table, but make up bits are needed for reconstruction and these must be compressed as well (when compression follows the downsampling). The resulting compression is significantly worse when the make up bits are included and compressed.

Upsampling

The present invention sets forth various upsampling techniques. These include replication, template upsampling (down pixels only), and template upsampling (down and up pixels). Each of these may be used alone or in combination with one of the downsampling techniques described herein or with a downsampling technique in the prior art.

Replication Upsampling

Replication is a prior art technique in which every down pixel is coded into four upsampled pixels, two horizontal and two vertical. This is also called "zero order hold". In one embodiment, replication is used for upsampling data that has been downsampled using error diffusion.

Note that replication may be performed in only one dimension and in directions other than horizontal or vertical if desired.

Template Upsampling (Down Pixels Only)

Figure 6:
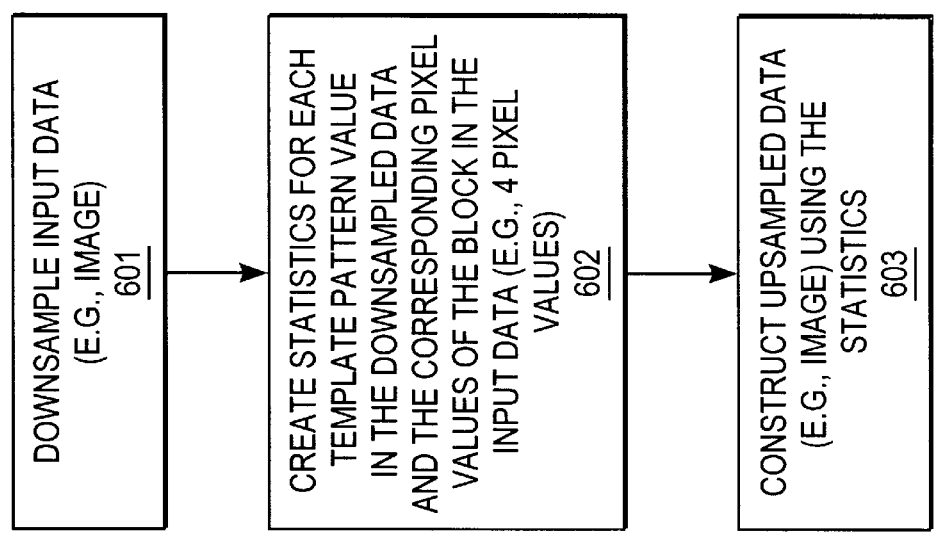
FIG. 6 illustrates one embodiment of the upsampling processing of the present invention.

In the present invention, template upsampling using down pixels only provides for upsampling each of the downsample input values to construct upsample data values of a block of pixels using statistics based on template pattern values of a predetermined number of downsample pixel values. That is, in the present invention, a table is created from a template from the original image and the downsampled image. This table is then used for upsampling. FIG. 6 illustrates the processing of the present invention.

Referring to FIG. 6, processing logic downsamples input data (processing block 601), creates statistics for each template pattern value and the downsampled data and the corresponding pixel values of the block in the input data (processing block 602), and then constructs upsampled data using the statistics (processing block 603).

The table of the present invention is comprised of a series of entries each of which is addressed based on specific template patterns. The template pattern may be converted into an address to access each entry in the table. Access to each entry causes the output of binary pixel values for the pixels in a block (e.g., for pixels) associated with the downsampled pixel value being upsampled.

To create the table, statistics are accumulated for each template pattern. That is, as a particular template value is encountered during downsampling, the particular four bit pattern of the pixel values (prior to downsampling) that occur most often when the template occurs becomes the binary pixel values that will be used when this template pattern occurs during upsampling. For example, if a downsampled pixel pattern indicates that the original pixels in the block had a particular 4 bit pattern 60% of the time the template pattern occurred, then all the downsampled pixels are upsampled using this pattern when the template is encountered during upsampling.

Figure 7:
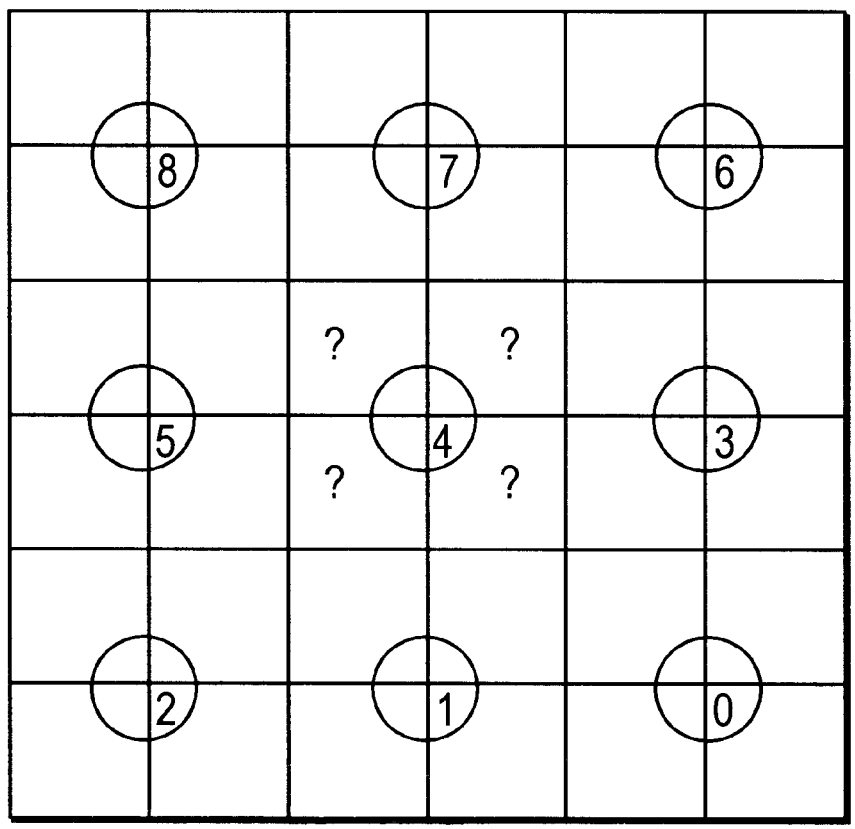
FIG. 7 illustrates a template of the downsampled pixels for providing template pattern values.

An example template is shown in FIG. 7. Note that nine downsampled pixel values set forth the template for upsampling the four bits indicated by questions marks. At the top of the template, two additional bits, bit 10 and bit 11, may be included to specify the relative location where the pixel value is that results from upsampling. For instance, if bit 10 is a 0, the pixel value that results from upsampling is in the top of the square; otherwise, it is in the bottom. Similarly, if bit 11 is 0, the pixel value may be in the left side of the square; otherwise, it is in the right side of the square. These two bits may be added to the template pattern to form a "context" by which to store the statistics.

When downsampling, statistics are maintained for the template represented by downsampled pixels 0–8. For instance, each time the template of downsampled values 0–8 occurs in a particular pattern, an indication is indicating what the four bits (?) were. After downsampling is completed, the four bits (?) that occurred most often for each pattern of the downsampled values 0–8 are stored and will be used during upsampling.

Therefore, statistics are created for each template pattern value in the downsampled image and the corresponding four pixel values in the original image. The four pixel values that occur most often for a particular template pattern value in a downsampled image is the four values used when upsampling the image when the particular template pattern value occurs. Of course, this implies that the statistics (e.g., the table) are signaled to the upsampling unit either along with the downsampled image or separately.

In the case of tie breakers where four pixel values occur the same number of times as another pattern of four bit pixel values for a particular template pattern value of downsampled signals, a tie breaker system may be used to decide which pattern to use.

Exemplary tie breaker systems could include using the most common pixel value in the original size to decide. If white is the most common pixel, then white is used during upsampling. On the other hand, if black is more common in the original image, then black is used for the particular template pattern value during upsampling. The decision of which pixel value is more common can be done regionally (what is the more common pixel value for this region) or across the entire image (what is the more common pixel value in the image). Other tie breakers may be used and would be apparent to one skilled in the art.

In an alternative embodiment, a precalculated static table or tables may be generated. The precalculated table may be set after a predetermined number of images. For instance, a table may be set after a hundred or thousand images. In such a case, an indication or signal may be used to indicate which table to used. Such an indication or signal is sent with the data or separately.

There is additional memory required for workspace memory when creating a table and for storage of the table(s) thereafter. For instance, 4K of memory may be required when ten bits of "context" (each template pattern value is 10 bits) are used. The memory may store the four pixel values used to replace the downsampled pixel value when each pattern occurs.

In one embodiment, a table may be implemented using four separate sections of memory, separating the individual pixel values. For instance, the upper left pixel value for 512 contexts (for a nine bit address) may be stored at memory locations 0 to 511, while the upper right pixel values are stored in locations 512 to 1,023, and so on.

Template Upsampling-Down and Up Pixels

In an alternative embodiment, upsampled pixels may be included in the template in a causal way. The statistics are generated in the same manner as described above in the template upsampling that is used in down pixels only. In this case, however, the template pattern values would include downsampled pixel values and original pixel values.

Figure 8A:
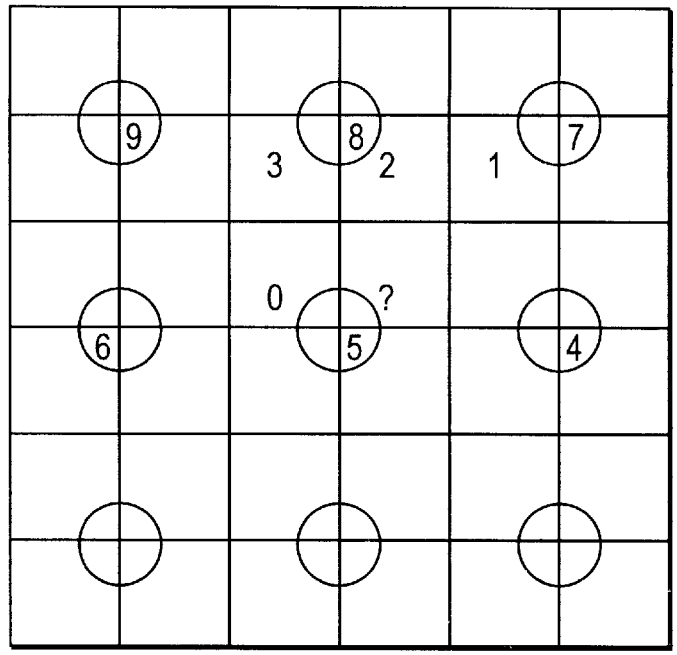
FIGS. 8A–8D illustrate examples of templates.
Figure 8B:
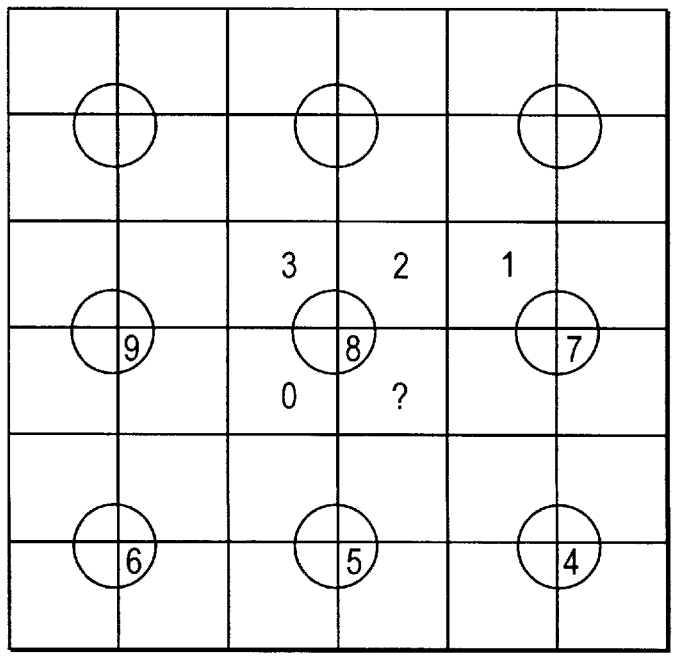
Figure 8C:
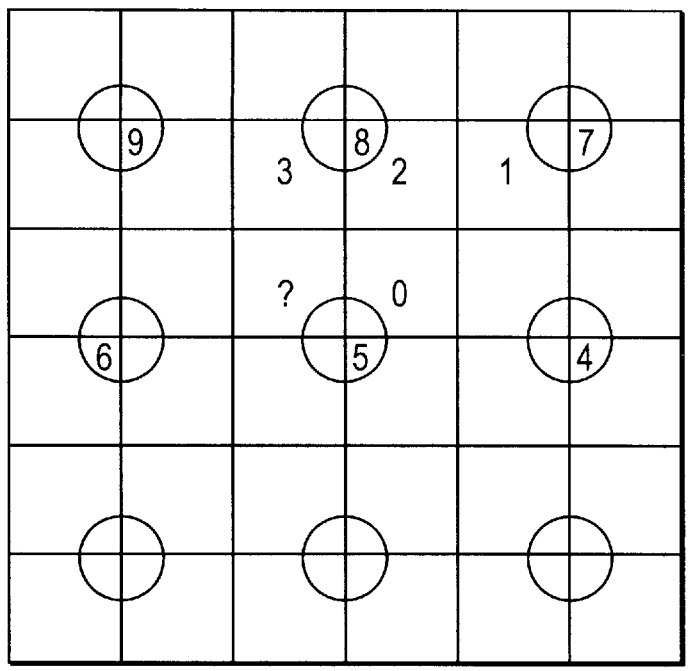
Figure 8D:
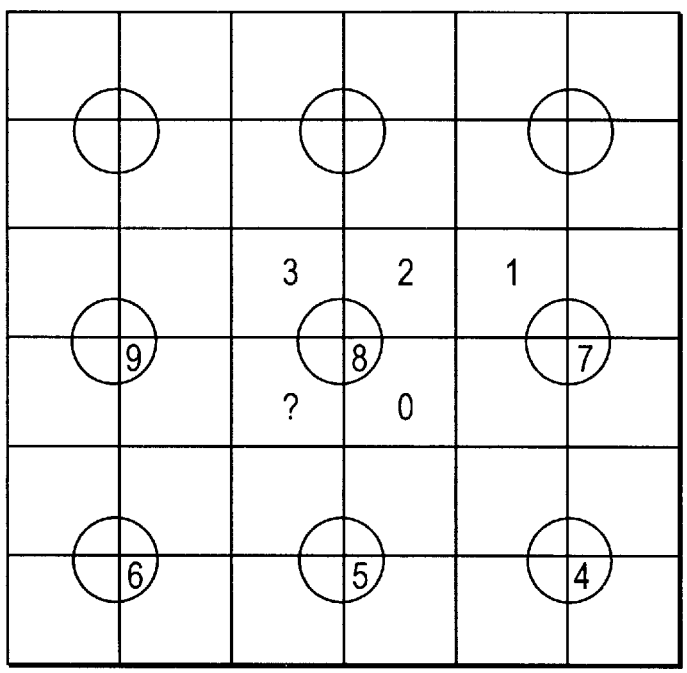

Examples of templates are shown in FIGS. 8A–8D. Referring to FIG. 8A, six downsampled pixels (4–9) are used in the template along with four upsampled pixel values (0–3). Note that the upsampled pixel value to be generated is not associated with the same downsampled pixel of all of the other upsampled pixels that are used. The upsampled pixel values 1–3 are in a separate row of blocks of pixels. FIG. 8B illustrates a case where all of the upsampled pixels used are in the same raster scan rows as those of the block associated with the upsampled pixel to be determined. FIGS. 8C and 8D illustrates variations of 8A and 8B respectively.

An Exemplary System

Figure 9:
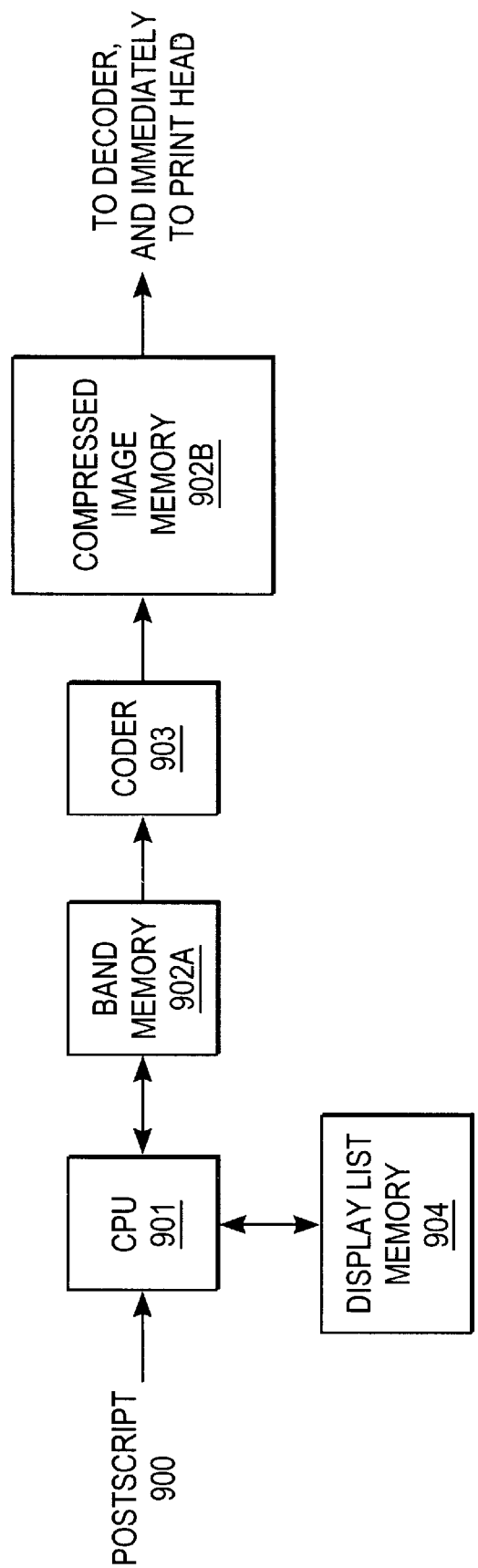
FIG. 9 illustrates a compressed frame storage system that main employ the present invention.

FIG. 9 illustrates a compressed frame storage system that may include the present invention. Referring to FIG. 9, the system comprises a CPU 901, a memory 902A, and a compressed image memory 902B. In one embodiment, the memory is actually in an contiguous address space, but is shown in FIG. 9 in two pieces.

In one embodiment, the system is a print system. CPU 901 translates postscript 900 into a display list description of an image and stores it in memory 904. The image is rendered on a band basis from the display list to a band buffer 902A. In the present invention, bands are small horizontal strips of the image. After a band is completely rendered into band buffer 902A, it is compressed by some method using coder 903, which may be a binary entropy coder 904. Any compression or coding method may be employed.

A certain amount of memory is allocated to a compressed rendered image, referred to as memory 902B. In one embodiment, the amount of memory is one quarter of the size of the image. If the amount of data needed to represent the band is less than its portion of the compressed image memory, no problem exists. If the data overflows, its allotment may need to be reduced in size. The downsampling of the present invention, employed as part of the compression of coder 904, allows for such reduction in size, while maintaining a higher image quality than prior art methods.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, downsampling and upsampling techniques have been described.

We claim:

1. A method of compressing information comprising:
   receiving binary pixel values; and
   downsampling the binary pixel values to generate a downsampled pixel value for each block of binary pixel values, the downsampled pixel value for each of a plurality of blocks of binary pixel values being generated based on a summation of pixel values in said each block of binary pixel values and at least one error value generated as a result of previously downsampling another block of pixel values with which said each block is in a predetermined causal relationship.

2. The method defined in claim 1 wherein said at least one error value comprises an error between a previously generated downsampled pixel value for said another block of pixel values and a more accurate value representation of said another block of pixel values.

3. The method defined in claim 1 wherein said at least one error value comprises:
   a first error between a first previously generated downsampled pixel value and a more accurate value representation of a first block of pixel values above said each block of pixel values; and
   a second error between a second previously generated downsampled pixel value and a more accurate representation of a second block of pixel values to the left of said each block of pixel values.

4. The method defined in claim 3 wherein the second error for use in generating a downsampled pixel value for each block of pixels at the beginning of raster scan lines comprises the second error generated when downsampling blocks of pixels located at the end of raster scan lines which immediately precedes the raster scan lines of said each block of pixels.

5. The method defined in claim 1 wherein the percent of black pixel values in the downsampled pixel values is approximately the same as the percent of black pixel values in the binary pixel values.

6. A method of compressing comprising:
   receiving binary pixel values; and
   downsampling blocks of pixels in the binary pixel data to produce downsampled pixel value for each of said blocks of pixels and, for each of the blocks of pixel values, at least one error value indication indicative of an amount of error associated with the downsampled pixel value and a more accurate representation of actual pixel values for said each block of pixel values, previously performed wherein the downsampled pixel value generated in response to said at least error value indication resulting from a previously performed downsampling determination of at least one block of pixel values.

7. The method defined in claim 6 wherein said at least one error value indication comprises two values.

8. The method defined in claim 6 wherein said at least one error value indication is causally propagated in raster scan order.

9. The method defined in claim 6 wherein said at least one error value indication comprises an error between a previously generated downsampled pixel value for said another block of pixel values and a more accurate value representation of said another block of pixel values.

10. The method defined in claim 6 wherein said at least one error value indication comprises:
    a first error between a first previously generated downsampled pixel value and a more accurate value representation of a first block of pixel values above said each block of pixel values; and
    a second error between a second previously generated downsampled pixel value and a more accurate representation of a second block of pixel values to the left of said each block of pixel values.

11. The method defined in claim 10 herein the second error for use in generating a downsampled pixel value for each block of pixels at the beginning of raster scan lines comprises the second error generated when downsampling blocks of pixels located at the end of raster scan lines which immediately precedes the raster scan lines of said each block of pixels.

12. The method defined in claim 6 wherein the percent of black pixel values in the downsampled pixel values is approximately the same as the percent of black pixel values in the binary pixel values.

13. A compressor comprising:
    a storage area to receive binary pixel data; and
    a downsampling unit to generate output values for independent blocks of pixels, in response to a summation of pixel values of pixels in said individual blocks and at least one error value indication depicting an amount of error associated with at least one result of downsampling in previous blocks of pixels, the output values representing a downsampled version of the binary pixel data, wherein the downsampling unit generates another at least one error value indication for use in a downsampling determination of at least one block of pixel values to be processed subsequently.

14. The compressor defined in claim 13 where said at least one error value indication is causally propagated in raster scan order.

15. The compressor defined in claim 13 wherein said at least one error value indication comprises an error between a previously generated downsampled pixel value for said another block of pixel values and a more accurate value representation of said another block of pixel values.

16. The compressor defined in claim 13 wherein said at least one error value indication comprises:
    a first error between a first previously generated downsampled pixel value and a more accurate value representation of a first block of pixel values above said each block of pixel values; and
    a second error between a second previously generated downsampled pixel value and a more accurate representation of a second block of pixel values to the left of said each block of pixel values.

17. The compressor defined in claim 16 wherein the second error for use in generating a downsampled pixel value for each block of pixels at the beginning of raster scan lines comprises the second error generated when downsampling blocks of pixels located at the end of raster scan lines which immediately precedes the raster scan lines of said each block of pixels.

18. The compressor defined in claim 13 wherein the percent of black pixels in downsampled pixel values is approximately the same as the percent of black pixels in the binary pixel values.

19. The compressor defined in claim 13 wherein the downsampling unit comprises a table.

20. A method of processing original data comprising
    downsampling the binary pixel values to generate a downsampled pixel value for each block of binary pixel values, the downsampled pixel value for each of a plurality of blocks of binary pixel value being generated based on a summation of pixel values in said each block of binary pixel values and at least one error value indication generated as a result of previously downsampling another block of pixel values and indicative of an error between a previously generated downsampled pixel value of said another block of pixel values and a more accurate value representation of another block of pixels; and
    performing replication on the downsampled data to reconstruct the original data.

21. A method of processing information said method comprising:
    receiving downsampled pixel values representing at least a portion of a downsampled version of an original image; and
    upsampling each of the downsampled pixel values to a block of upsampled pixel values, values of pixels in each block of upsampled pixel values being set to values of pixels in a block of pixels in the original image for which a template pattern of a predetermined number of downsampled pixel values were produced during downsampling, the block of pixels in the original image being selected according to statistics associated with the frequency at which the template pattern of the predetermined number of downsampled pixel values in the downsampled version of the original image had been generated during downsampling in response to the block of pixels in the original image.

22. The method defined in claim 21 wherein the downsampled pixel values comprise a downsampled image and the upsampled pixel values comprise an upsampled image.

23. The method defined in claim 21 further comprising:
    downsampling original image data; and
    creating the statistics for each template pattern value of downsampled pixel values and a corresponding block of pixels in the original image data.

24. The method defined in claim 23 wherein each block of pixels in the original data comprises four pixels.

25. The method defined in claim 23 further comprising signaling the statistics with the downsampled pixel values.

26. The method defined in claim 23 further comprising signaling an indication with the downsampled pixel values to enable selection of one of a plurality of statistics sets.

27. The method defined in claim 23 wherein the creating of statistics occurs during downsampling the original image data.

28. The method defined in claim 21 wherein the statistics comprise a table.

29. The method defined in claim 21 wherein upsampling each of the downsampled pixel values comprises upsampling downsampled pixel values using a template pattern value of downsampled pixel values and at least one upsampled pixel value.

30. The method defined in claim 21 further comprising addressing into a table using a template pattern value to specify a pattern of upsampled pixel values for replacing a downsampled pixel value.

31. The method defined in claim 29 wherein the upsampled pixel values comprise upsampled pixel values from the same raster lines associated with the downsampled value being upsampled.

32. The method defined in claim 29 wherein the upsampled pixel values comprise upsampled pixel values from the same and previous raster lines associated with the downsampled value being upsampled.

33. A system for processing information, said system comprising:
    means for receiving downsampled pixel values representing at least a portion of a downsampled version of an original image; and
    means for upsampling each of the downsampled pixel values to a block of upsampled pixel values, values of pixels in each block of upsampled pixel values being set to values of pixels in a block of pixels in the original image for which a template pattern of a predetermined number of downsampled pixel values were produced during downsampling, the block of pixels in the original image being selected according to statistics associated with the frequency at which the template pattern of the predetermined number of downsampled pixel values in the downsampled version of the original image had been generated during downsampling in response to the block of pixels in the original image.

34. A computer software product including a medium readable by a processor, the medium having stored thereon a sequence of instructions which, when executed by the processor, causes the processor to downsample the binary pixel values to generate a downsampled pixel value for each block of binary pixel values, the downsampled pixel value for each of a plurality of blocks of binary pixel values being generated based on a summation of pixel values in said each block of binary pixel values and at least one error value indication generated as a result of previously downsampling another block of pixel values and indicative of an error between a previously generated downsampled pixel value of said another block of pixel values and a more accurate value representation of said another block of pixels.

35. A computer software product including a medium readable by a processor, the medium having stored thereon a sequence of instructions which, when executed by the processor, causes the processor to:

receive downsampled pixel values representing at least a portion of a downsampled version of an original image upsample each of the downsampled pixel values to a block of upsampled pixel values, values of pixels in each block of upsampled pixel values being set to values of pixels in a block of pixels in the original image for which a template pattern of a predetermined number of downsampled pixel values were produced during downsampling, the block of pixels in the original image being selected according to statistics associated with the frequency at which the template pattern of the predetermined number of downsampled pixel values in the downsampled version of the original image had been generated during downsampling in response to the block of pixels in the original image.

36. An apparatus for compressing information comprising:

means for receiving binary pixel values; and means for downsampling the binary pixel values to generate a downsampled pixel value for each block of binary pixel values, the downsampled pixel value for each of a plurality of blocks of binary pixel values being generated based on a summation of pixel values in said each block of binary pixel values and at least one error value generated as a result of previously downsampling another block of pixel values with which said each block is in a predetermined causal relationship.

37. The apparatus defined in claim 36 wherein said at least one error value comprises an error between a previously generated downsampled pixel value for said another block of pixel values and a more accurate value representation of said another block of pixel values.

38. The apparatus defined in claim 36 wherein said at least one error value comprises:

a first error between a first previously generated downsampled pixel value and a more accurate value representation of a first block of pixel values above said each block of pixel values; and a second error between a second previously generated downsampled pixel value and a more accurate representation of a second block of pixel values to the left of said each block of pixel values.

39. The apparatus defined in claim 38 wherein the second error for use in generating a downsampled pixel value for each block of pixels at the beginning of raster scan lines comprises the second error generated when downsampling blocks of pixels located at the end of raster scan lines which immediately precedes the raster scan lines of said each block of pixels.

40. The apparatus defined in claim 36 wherein the percent of black pixel values in the downsampled pixel values is approximately the same as the percent of black pixel values in the binary pixel values.

41. An apparatus for compressing comprising:

means for receiving binary pixel values; and means for downsampling blocks of pixels in the binary pixel data to produce downsampled pixel value for each of said blocks of pixels and, for each of the blocks of pixel values, at least one error value indication indicative of an amount of error associated with the downsampled pixel value and a more accurate representation of actual pixel values for said each block of pixel values, previously performed wherein the downsampled pixel value generated in response to said at least error value indication resulting from a previously performed downsampling determination of at least one block of pixel values.

42. The apparatus defined in claim 41 wherein said at least one error value indication comprises two values.

43. The apparatus defined in claim 41 said at least one error value indication is causally propagated in raster scan order.

44. The apparatus defined in claim 41 wherein said at least one error value indication comprises an error between a previously generated downsampled pixel value for said another block of pixel values and a more accurate value representation of said another block of pixel values.

45. The apparatus defined in claim 41 wherein said at least one error value indication comprises:

a first error between a first previously generated downsampled pixel value and a more accurate value representation of a first block of pixel values above said each block of pixel values; and a second error between a second previously generated downsampled pixel value and a more accurate representation of a second block of pixel values to the left of said each block of pixel values.

46. The apparatus defined in claim 45 wherein the second error for use in generating a downsampled pixel value for each block of pixels at the beginning of raster scan lines comprises the second error generated when downsampling blocks of pixels located at the end of raster scan lines which immediately precedes the raster scan lines of said each block of pixels.

47. The apparatus defined in claim 41 wherein the percent of black pixel values in the downsampled pixel values is approximately the same as the percent of black pixel values in the binary pixel values.

48. An apparatus for processing original data comprising:

means for downsampling the binary pixel values to generate a downsampled pixel value for each block of binary pixel values, the downsampled pixel value for each of a plurality of blocks of binary pixel value being generated based on a summation of pixel values in said each block of binary pixel values and at least one error value indication generated as a result of previously downsampling another block of pixel values and indicative of an error between a previously generated downsampled pixel value of said another block of pixel values and a more accurate value representation of another block of pixels; and means for performing replication on the downsampled data to reconstruct the original data.

* * * * *